(12) United States Patent
Hebert et al.

(10) Patent No.: US 6,869,578 B1
(45) Date of Patent: Mar. 22, 2005

(54) APPARATUS USING PLATE ARRANGEMENT FOR EXOTHERMIC REACTIONS

(75) Inventors: Philippe Hebert, Fontenay-aux-Roses (FR); Jacques J. L. Romatier, Riverwoods, IL (US); Peter R. Pujado, Kildeer, IL (US); Bipin V. Vora, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 494 days.

(21) Appl. No.: 09/791,973

(22) Filed: Feb. 22, 2001

Related U.S. Application Data

(62) Division of application No. 09/149,606, filed on Sep. 8, 1998, now Pat. No. 6,228,341.

(51) Int. Cl.[7] .............. B01J 8/02; B01J 8/04; B01J 8/06; F28F 3/12; F28F 3/14
(52) U.S. Cl. .............. 422/198; 422/196; 422/197; 422/211; 165/138; 165/157; 165/168; 165/169; 165/170
(58) Field of Search .................. 422/198, 196, 422/197, 211, 216, 221, 311; 165/53, 57, 104.19, 138, 157, 162, 168–170

(56) References Cited

U.S. PATENT DOCUMENTS

| | | | | |
|---|---|---|---|---|
| 2,127,561 A | * | 8/1938 | Herrmann ............... | 422/160 |
| 4,101,287 A | * | 7/1978 | Sweed et al. ............ | 422/200 |
| 5,130,106 A | | 7/1992 | Koves et al. ............ | 422/216 |
| 5,167,933 A | | 12/1992 | Norsk .................... | 422/148 |
| 5,405,586 A | | 4/1995 | Koves ..................... | 422/218 |
| 5,525,311 A | | 6/1996 | Girod et al. ............ | 422/200 |
| 5,538,700 A | * | 7/1996 | Koves ..................... | 422/200 |
| 5,600,053 A | | 2/1997 | Girod et al. ............ | 585/654 |

* cited by examiner

*Primary Examiner*—Alexa Doroshenk
(74) *Attorney, Agent, or Firm*—John G. Tolomei; James C. Paschall

(57) ABSTRACT

A process and apparatus cools a heat exchange type reaction zone by passing the incoming reactants through heat exchange channels in heat exchange relationship with the reaction zone. The invention simplifies the operation and construction of the heat exchanging type reaction zone by directly communicating reaction channels that contain the reaction with the heating channels that heat reactant across an open manifold located at the end of the channels. Additional reactants, cooling fluids, or other diluents may enter the process directly through the manifold space to permit further temperature control of the reaction zone. The invention promotes better heat transfer efficiency than tube and shell heat transfer arrangements that have been used for similar purposes. The narrow channels are preferably defined by corrugated plates. The reaction channels will contain a catalyst for the promotion of the primary reaction.

12 Claims, 6 Drawing Sheets

CASE 1

CASE 2

CASE 3

CASE 4

CASE 5

CASE 6

CASE 7

APPARATUS USING PLATE ARRANGEMENT FOR EXOTHERMIC REACTIONS

CROSS-REFERENCE TO RELATED APPLICATION

This application is a Division of Application Ser. No. 09/149,606 filed Sep. 8, 1998, now U.S. Pat. No. 6,228,341, the contents of which are hereby incorporated by reference.

FIELD OF THE INVENTION

This invention relates generally to plate type exchangers for cooling a reaction zone by indirect heat exchange with a cooling fluid stream.

BACKGROUND OF THE INVENTION

In many industries, like the petrochemical and chemical industries, contact of reaction fluids with a catalyst in a reactor under suitable temperature and pressure conditions effects a reaction between the components of one or more reactants in the fluids. Most of these reactions generate or absorb heat to various extents and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone. The heating of reactants may be useful for a variety of exothermic and endothermic processes. Dehydrogenation processes represent one class of endothermic processes that particularly benefit from indirect reaction zone heating to maintain a desired temperature profile.

This invention is particularly suited for exothermic processes. Exothermic reaction processes encompass a wide variety of feedstocks and products. Moderately exothermic processes include methanol synthesis, ammonia synthesis, and the conversion of methanol to olefins, phthalic anhydride manufacture by naphthalene orthoxylene oxidation, acrylonitrile production from propane or propylene, acrylic acid synthesis from acrolein, conversion of n-butane to maleic anhydride, the production of acetic acid by methanol carbonylation and methanol conversion to formaldehyde. Oxidation reactions generally represent a class of highly exothermic reactions. The exothermic nature of these reactions has led to many of these reactions incorporating a cooling system into the reactor design. Those skilled in the art routinely overcome the exothermic heat production with quench or heat exchange arrangements. Extensive teachings detail methods of indirectly exchanging heat between the reaction zone and a cooling medium. The art currently relies heavily on tube arrangements to contain the reaction and supply indirect contact with the cooling medium. The geometry of tubular reactors poses layout constraints that require large reactors and vast tube surface to achieve high heat transfer efficiencies.

Other process applications accomplish indirect heat exchange with thin plates that define channels. The channels alternately retain catalyst and reactants in one set of channels and a heat transfer fluid in adjacent channels for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Many hydrocarbon conversion processes will operate more advantageously by maintaining a temperature profile that differs from that created by the heat of reaction. In many reactions, the most beneficial temperature profile will be obtained by maintaining substantially isothermal conditions. In some cases, a temperature profile directionally opposite to the temperature changes associated with the heat of reaction will provide the most beneficial conditions. For such reasons it is generally known to contact reactants with a heat exchange medium in cross-flow, concurrent flow, or counter-current flow arrangements. A specific arrangement for heat transfer and reactant channels that offers more complete temperature control can be found in U.S. Pat. No. 5,525,311, the contents of which are hereby incorporated by reference. Other useful plate arrangements for indirect heat transfer are disclosed in U.S. Pat. No. 5,130,106 and U.S. Pat. No. 5,405,586.

Isolating reactants from coolants at the inlets and outlets of a plate exchanger arrangement leads to elaborate designs and intricate manufacturing procedures. Simplification of the fluid transfer at the inlets and outlets of a plate exchanger arrangement improves the cost effectiveness of and practicality of such arrangements in many processes.

It is, therefore, an object of this invention to simplify plate exchanger arrangements for the cooling of an exothermic reaction zone by indirect heat transfer.

It is a further object of this invention to simplify the feed and recovery of reactants and coolants from a heat exchange reactor using narrow channels.

BRIEF SUMMARY OF THE INVENTION

This invention incorporates open chamber portions to transfer fluid for indirectly transferring heat produced in the reaction channels to the heated channels that absorb heat by raising the temperature of a reactant-containing stream. A chamber communicates the ends of the channels to provide simple transfer of the heated channels with the reaction zone across common ends of the narrow channels. The chamber permits additional temperature control by the addition or removal of reactants and by cooling fluids or other streams at an intermediate point along the total channel flow path. Insertion of additional chambers along the flow path of either the reaction or heated channels provides locations for more temperature adjustment and control.

Suitable channel arrangements may exchange heat directly across a common heat exchange surface or may use an intermediate heat transfer fluid to transfer heat from the cooling zone to the reaction zone while simultaneously providing temperature adjustment control. One arrangement of the intermediate heat transfer fluid may place the cooling zone and the reaction zone at different portions of common channels and may pass the intermediate fluid through adjacent channels to transfer heat out of the reaction channels at one location and transfer heat back into the heated channels at a downstream channel location. In other arrangements the intermediate channels and the reaction channel may lie in a parallel arrangement between the heated channels to adjust the temperature in the reaction channels through the heated channels.

In most cases, the reactant-containing stream will pass through the heated channels and then directly into the reaction channels to provide continuous fluid flow through all channels with an essentially constant pressure in all of the channels. Circulation of the reactant-containing stream around the outer shell of the vessel that contains the channel defining plates can offer further temperature control. Appropriate processes may also incorporate an endothermic reaction into the heated channels to further control temperatures.

The resulting reaction apparatus designed in accordance with this invention offers flexibility in temperature control with a relatively simple plate reactor arrangement. The outer containment vessel can completely support the plate arrangement from either its top or its bottom. Direct passage of heated reactants from the heated channels to the reaction channel from common ends in a chamber eliminates welding at least one end of multiple thin plates.

The presence of narrow heat exchange channels for cooling the reaction zone and for heating the reactants constitutes an essential requirement of this invention. With respect to fluid flow through the reaction channels and heated channels, the fluids may have co-current flow or cross-flow with respect to some of the channels. However, advantageous use of the chamber design of this invention requires that at least two adjacent sets of channels establish counter-current flow.

Variations in the catalyst loading within the reaction channels and the addition of catalyst for endothermic reactions may satisfy different processing objectives. For example, short loading of catalyst in reaction channels can provide a space above or below the reaction zone for additional feed preheat or effluent cooling. Again, extending the heated channels can provide additional surface area for open channel heat exchange against the exiting reaction zone effluent or the incoming reactants.

Another variation on the plate arrangement can use two or more separate stacks of heat exchange plates or "reaction stacks" to conduct different reactions and heat is exchange steps in isolated reaction zones. For example, one arrangement of alternating narrow channels in a reaction stack may contain catalyst for one reaction step in one set of channels while exchanging heat with the entering feed in another set of channels. A system of manifolds can then pass the isolated preheated feed and secondary steam reforming effluent to another section of heat exchange channels that again indirectly contacts the hot gases from the secondary reforming reaction in indirect heat exchange with channels containing catalyst for a primary reforming reaction. Suitable ducting can then return all or any portion of the primary reforming reaction zone effluent to the secondary reforming reaction zone. Integration of the manifolds with external pipes can further enhance process control.

The plates defining the channels for containing the reactions and heat exchange gases may have any configuration that produces narrow channels. A preferred form of the heat exchange elements is relatively flat plates having corrugations defined therein. The corrugations serve to maintain spacing between the plates while also supporting the plates to provide a well supported system of narrow channels. Additional details on the arrangement of such plate systems are shown in U.S. Pat. No. 5,525,311, the contents of which are hereby incorporated by reference.

Suitable plate arrangements may also incorporate perforated plates. Most advantageously, perforated plates would allow the controlled quantities of the heated reactant to flow directly into the reaction channels. Perforated plates would disperse the introduction of the reactant over a desired portion of the reaction zone. Those skilled in the art will recognize other variations in plate configurations that can provide additional benefits to the integrated reforming stages.

Accordingly, in a broad process embodiment, this invention contacts reactants with a catalyst in a reaction zone while indirectly heating or cooling the reactants in the reaction zone by indirect heat exchange. The process passes an input stream containing at least a portion of a fluid for the reaction zone through a plurality of narrow heat exchange channels defined by at least a first portion of spaced apart plates to heat or cool the input stream and supply a portion of the fluid entering the reaction zone. The input stream may comprise a reactant or an inert stream that passes through the reaction zone. The heated or cooled input stream passes with or without additional fluid input, to the reaction zone as a reaction stream that contacts a catalyst material in the reaction zone to produce a reacted stream. The input stream undergoes heat exchange in the heat exchange channels by indirect heat exchange with the reaction stream or the reacted stream across the spaced apart plates. A common manifold communicates common ends of at least two channels defined by the spaced apart plates to indirectly exchange heat from the reaction zone to the heat exchange channels. The process collects at least a portion of the reacted stream downstream of channels defined by a second portion of the spaced apart plates. In a specific aspect of this embodiment the common manifold communicates the outlet of the heat exchange channels with the inlets of the reaction channels and preferably an additional stream enters the manifold for admixture with input stream as it exits the heat exchange channels.

In a more specific form of this embodiment, the process passes the reactant-containing stream through a plurality of narrow heated channels defined on one side of spaced apart plates and a plurality of narrow reaction channels defined by the opposite side of the spaced apart plates. Another specific operation communicates common ends of the heated channels and the reaction channels across an open chamber at one of the reaction and heated channels to pass at least a portion of the reactant containing stream from the heated channels to the reaction channels as at least a portion of the heated reaction stream.

Accordingly, in a more narrow process embodiment, this invention contacts reactants with a catalyst in a reaction zone while indirectly heating the reactants and cooling the reaction zone by indirect heat exchange. The process passes a reactant containing-stream through a plurality of narrow heated channels defined by at least a first portion of spaced apart plates to heat the reactant-containing stream and to produce a heated reactant stream. The heated reactant stream passes as a reaction stream to a reaction zone that contacts the reaction stream with a catalyst material in the reaction zone to produce a reacted stream. The reactant-containing stream undergoes heating from the reacted stream in the heated channels by indirect heat exchange with the reaction stream or the reacted stream across the spaced apart plates. A common manifold communicates common ends of at least two channels defied by the spaced apart plates to indirectly exchange heat from the reaction zone to the heated channels. The process collects at least a portion of the reacted stream downstream of channels defined by a second portion of the spaced apart plates.

In a more specific form of this embodiment, the process passes the reactant-containing stream through a plurality of narrow heated channels defined on one side of spaced apart plates and a plurality of narrow reaction channels defined by the opposite side of the spaced apart plates. Another specific operation communicates common ends of the heated channels and the reaction channels across an open chamber at the one end of the reaction and heated channels to pass at least a portion of the reactant-containing stream from the heated channels to the reaction channels as at least a portion of the heated reaction stream.

In an apparatus embodiment, this invention includes a plurality of reaction channels defined by a plurality of spaced apart plates having heated reactant inlets at one end of the reaction channels and reacted stream outlets at an opposite end of the reaction channels. The reaction channels contain means for retaining a solid catalyst in the reaction channels. A plurality of heated channels defined by a plurality of spaced apart plates in an indirect heat exchange relationship with the reaction channels has cold reactant fluid inlets at one end and heated reactant outlets at an opposite end. A containment vessel houses the plurality of spaced apart plates. The containment vessel defines a chamber for communicating the heated reactant outlets with the heated reactant inlets. The containment vessel includes a support structure for supporting one end of the plates from the top or the bottom of the containment vessel.

Additional embodiments, arrangements, and details of this invention are disclosed in the following detailed description of the invention.

DETAILED DESCRIPTION OF THE INVENTION

This invention may be useful in any exothermic or endothermic process. This invention is particularly useful in any exothermic process where a reactant or a portion of a reactant provides a heat sink for cooling an exothermic reaction in an arrangement of plate exchanger elements. Additional requirements of this process for compatibility with a plate exchanger arrangement will typically require that there be a relatively low ΔT between the exothermic and endothermic reaction zones. Differential temperatures of 200° C. or less are preferred for this invention. Due to the interconnection of adjacent channels, differential pressures will remain low and will typically reflect pressure drop requirements through the catalyst bed. Ordinarily, the differential pressure across plate elements will not exceed 0.5 MPa.

The reaction channels will contain a catalyst for promoting the exothermic reaction process. Suitable catalysts for the previously mentioned exothermic processes as well as other exothermic or endothermic process applications are well known to those skilled in the art. Catalyst in a particulate form may fill the reaction channels in an amount that provides the desired reaction time and any pre-reaction heating or post-reaction cooling in the reaction channels. As an alternate to a particulate catalyst, the catalyst may also be coated on the surface of the plates in the various reforming zones. It may be particularly advantageous to coat the reaction catalyst onto the plates to provide an upper catalytic section and a lower catalyst-free section that are maintained in a heat exchange relationship with a catalytic secondary reforming section on the other side of the plates.

Where suitable for balancing heat requirements of a particular reaction, those skilled in the art are aware of particular catalysts for promoting complimentary endothermic reactions. Such catalysts may advantageously reside in the heating channels to provide reactive cooling as well as cooling from sensible or latent heat of the reactants. An example of such an endothermic and exothermic catalyst combination is steam reforming. Such an arrangement is particularly suited for incorporation into a multiple pass channel arrangement that interconnects only two pairs of adjacent channels and places an exothermic reaction channel between alternate heating channels and endothermic reaction channels. In a three pass arrangement of such a configuration, the relatively cold reactants flow into the heating channels where indirect heat exchange with the reaction channels provides the respective heating and cooling. Flowing the reacted stream from the exothermic reaction channels into the endothermic reaction channels provides additional cooling to the reaction channels across the shared plates that define the endothermic reaction channel as well as the adjacent exothermic reaction channels.

Figure 1:
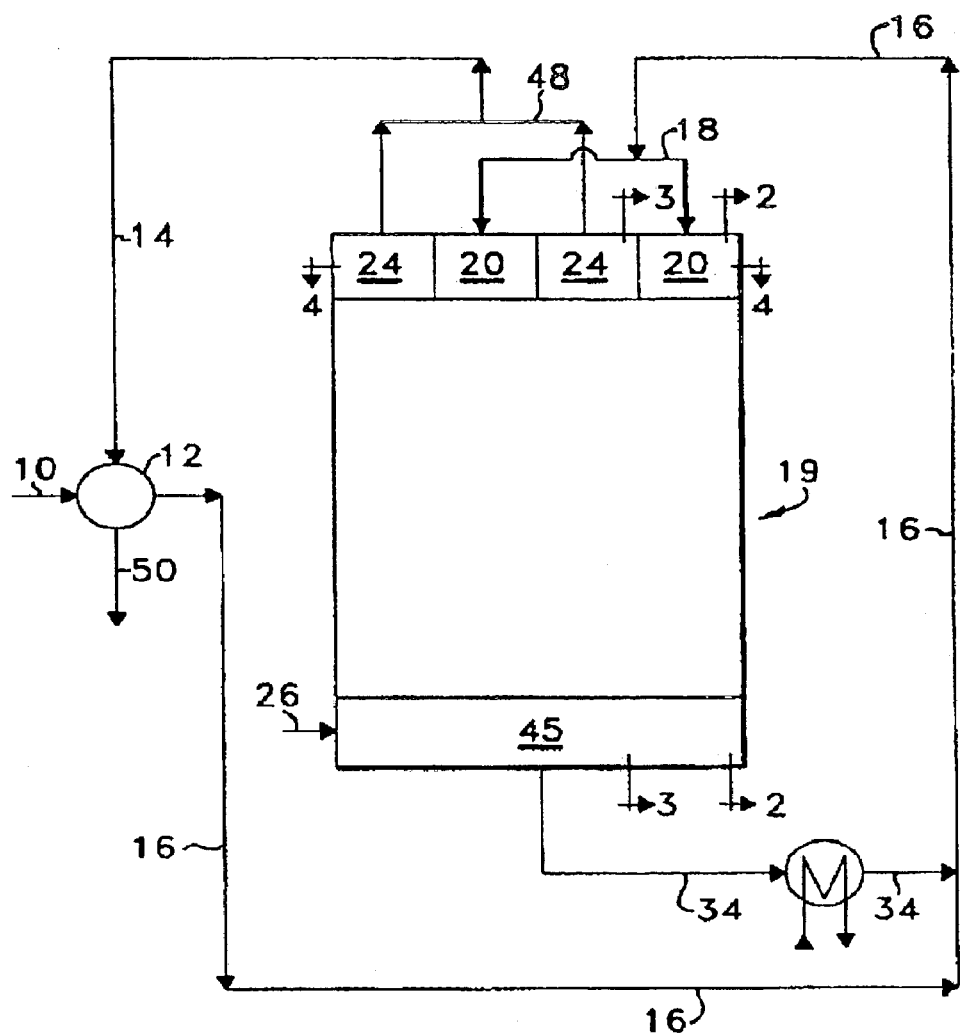
FIG. 1 is a schematic flow diagram of a reactor and heat exchanger arrangement for a reactor arranged in accordance with this invention.

FIG. 1 illustrates a basic flow arrangement for the process of this invention. The discussion of FIG. 1 uses the production of phthalic anhydride (PA) as an example of a specific context for an exothermic process. However, the general principles apply to any exothermic process including those previously enumerated. Looking then at FIG. 1, in a basic flow arrangement of this invention a relatively cold stream comprising orthoxylene and oxygen or air enters the process via line 10. In the case of air, the feed proportions are generally in a range of from 40 to 300 g orthoxylene per $Nm^3$ of air and preferably the proportion of orthoxylene to air will not exceed 200 g per $Nm^3$ of air. The entering feed undergoes heat exchange in a conventional heat exchanger 12 with a PA gas product stream carried by a line 14. The preheated feed stream passes via line 16 to a distribution header 18. Distribution header 18 supplies the heated feed to distribution spaces 20 in a heat exchange reactor 19. As further shown by FIG. 2, distribution space 20 distributes the heated synthesis gas to the top of a plurality of inlets 42 of heated channels 44. Distribution space 20 has the tops 47 of reaction channels 22 closed to gas flow to prevent the incoming reactants from flowing directly into contact with the PA oxidation catalyst contained therein. Downward passage of the feed through channels 44 heats the feed gases while simultaneously cooling reaction channels 22 across the large surface area provided by the plates 25 that define the heating and reaction channels. Manifold space 45 collects the heated orthoxylene-containing feed from the open outlets 46 of heated channels 44.

Figure 2:
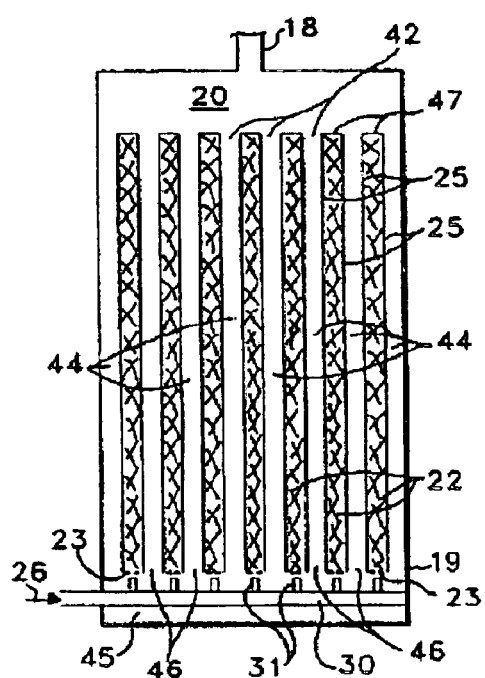
FIG. 2 is a section of the schematic heat exchange reactor shown in FIG. 1 taken at section 2—2.
Figure 3:
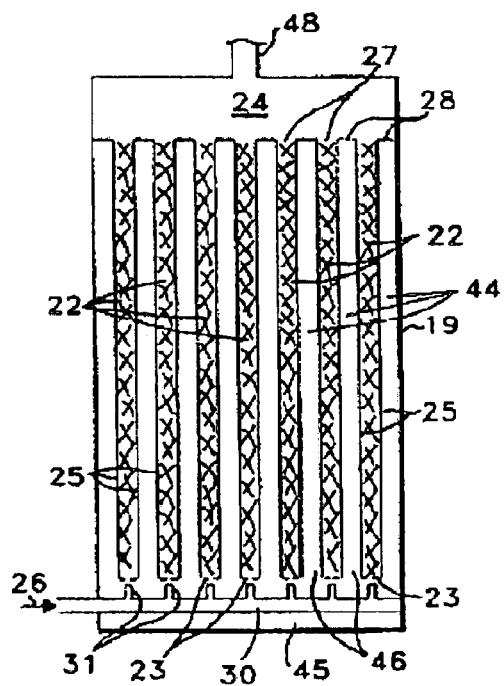
FIG. 3 is a section of the schematic heat exchange reactor shown in FIG. 1 taken at section 3—3.

As shown in FIGS. 2 and 3, manifold space 45 redistributes and collects feed from channels 44 to the inlets 23 of reaction channels 22. The heated oxidation reactants pass through the channels 22. Reaction channels 22 contain the above mentioned catalyst material that promotes the oxidation of the orthoxylene. Suitable catalyst materials comprise a variety of vanadium phosphates. The catalyst material may reside in the channels as a coating applied to plates 25 or as discrete particles. The inlets 23 of the reaction channels 22 are open to gas flow. Where the catalyst material comprises particulate material, a screen material located across inlets 23 prevents catalyst from falling from channels 22. FIGS. 1 and 3 depict a collection space 24 that collects the effluent from the primary reforming zone across the open tops that provide outlets 27 of channels 22. A manifold 48 gathers the collected PA-containing effluent and transfers it into product line 14 for recovery downstream of exchanger 12 via line 50.

Figure 4:
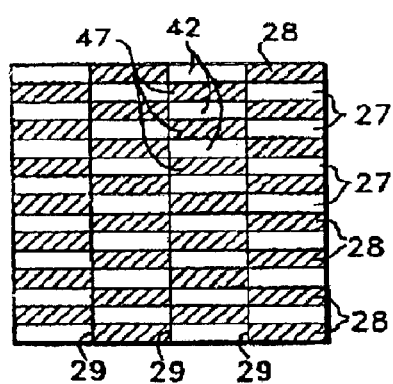
FIG. 4 is a horizontal section of the schematic heat exchange reactor shown in FIG. 1 taken at section 44.

The arrangement of distribution space 20 and 24 to selectively distribute the entering reactants and collect the oxidation zone effluent is more fully appreciated from FIG. 4. As shown by FIG. 4, those portions of reaction channels 22 that coincide with collection space 24 maintain outlets 27 open for free communication therewith. Conversely, those portions of heated channels 44 that coincide with collection space 24 have a closure 28 that prevents fluid communication with collection space 24. Distribution space 20 has the reverse relationship to channels 22 and 44 wherein coinciding portions of channels 44 communicate openly across inlets 42 while coinciding portions of channels 22 are blocked from communication with distribution space 20 by closures 47. FIG. 4 also shows the partitions 29 that internally segregate collection spaces 24 from distribution spaces 20.

Manifold space 45 may provide additional temperature and reaction fictions or controls. For example, intermediate nozzles 31 may withdraw or add fluid to manifold space 45. Withdrawal of fluid may provide additional cooling by passing a portion of the withdrawn reactant-containing stream through a cooler via a line 34 and by recirculating the cooled fluid to heated channels 44 via line 16, header 18, and distribution space 20. It is also not necessary to the practice of this invention that each reaction channel be alternated with a heated channel. Possible configurations of the reaction section may place two or more heat exchange channels between each reactant channel to reduce the pressure drop on the heat exchange medium side, particularly when recirculating a portion of the reactant stream for additional cooling. When used for this purpose, a plate separating adjacent heat exchange channels may contain perforations. Providing an increased flow area of heated channels relative to the reaction channels will accommodate recirculation of a portion of the reactant containing stream without excessive pressure drop. The use of packing or perforated plates within the heated channel can enhance heat transfer with the reaction channels while providing good circulation over the entire cross section of the heated channel.

As a further example of additional functions, a line 26 may transfer additional fluids into the manifold space 45. A distributor, feasibly in the form of a pipe 30, may use nozzles 31 to inject the additional fluid at a location near inlets 23 of reaction channels 22. Injection near the inlets 23 concentrates the entry of the added fluid directly into channels 22. Injected fluids may include additional reactants, supplemental cooling fluid, or other diluents.

In general, the invention relies on relatively narrow channels to provide the efficient heat exchange across the thin plates. The channel width should be less than one inch on average with an average width of less than 0.5 inch preferred. Suitable plates for this invention will comprise any plates that allow a high heat transfer rate. Thin plates are preferred and usually have a thickness of from 1 to 2 mm. The plates are typically composed of ferrous or non-ferrous alloys such as stainless steel. Preferred alloys for the plates will withstand extreme temperatures and contain high proportions of nickel and chrome. The plates may be formed into curves or other configurations, but flat plates are generally preferred for stacking purposes. Again, each plate may be smooth and additional elements such as spacers of punched tabs may provide fluid turbulence in the channels.

Preferably, each plate has corrugations that are inclined to the flow of reactants and heat exchange fluid. The corrugations maintain a varied channel width defined by the height of the corrugations. In the case of corrugations, the average channel width is most practically defined as the volume of the channels per the cross-sectional area parallel to the primary plane of the plates. By this definition, corrugated plates with essentially straight sloping side walls will have an average width that equals half of the maximum width across the channels.

Figure 5:
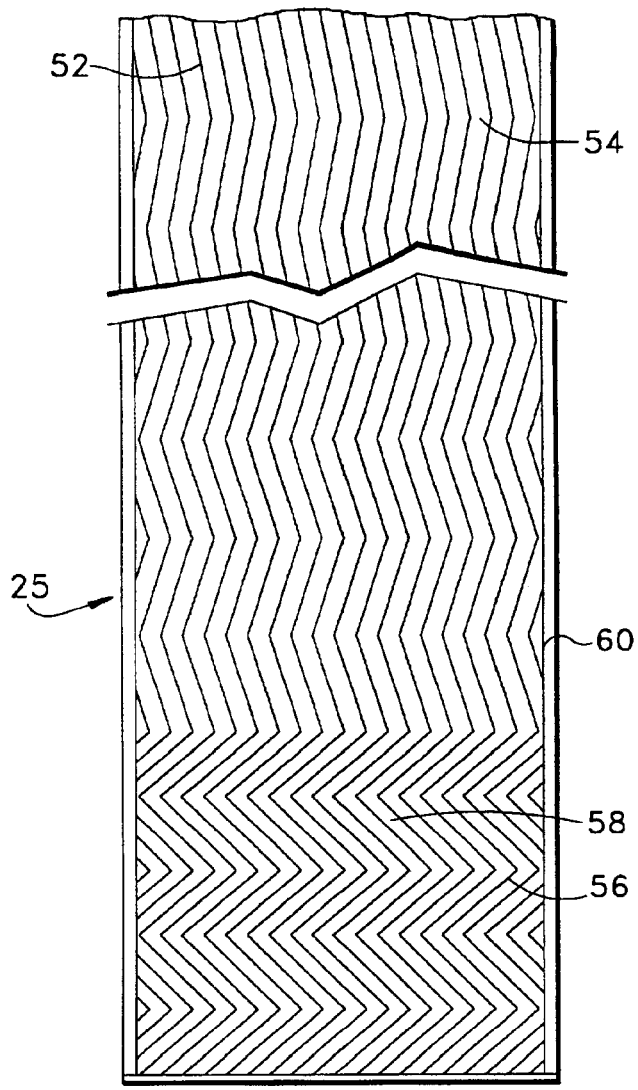
FIG. 5 is a schematic drawing of a flat plate element showing a corrugation pattern.

FIG. 5 shows the preferred corrugation arrangement for the plates 25 that divide the central portion of heat exchange reactor 19 into heated channels and reaction channels. The corrugation pattern can serve at least two functions. One function is to structurally support adjacent plates. The other function is to promote turbulence for enhancing heat exchange efficiency in the narrow reaction channel. FIG. 5 shows corrugations defined by ridges 52 and valleys 54. The frequency or pitch of the corrugations may be varied as desired to promote any varying degree of turbulence. Therefore, more shallow corrugations with respect to the fluid flow direction, as shown by ridges 52 and valleys 54, will produce less turbulence, and whereas a greater corrugation pitch with respect to the direction of fluid flow, as shown by ridges 56 and valleys 58, will provide increased turbulence where desired. The pitch of the corrugations and the frequency may also be varied over a single heat exchange channel to vary the heat transfer factor in different portions of the channel. Preferably, the channels may contain a flat portion 60 about their periphery to facilitate closure of the channels about the sides and tops where desired.

Figure 6:
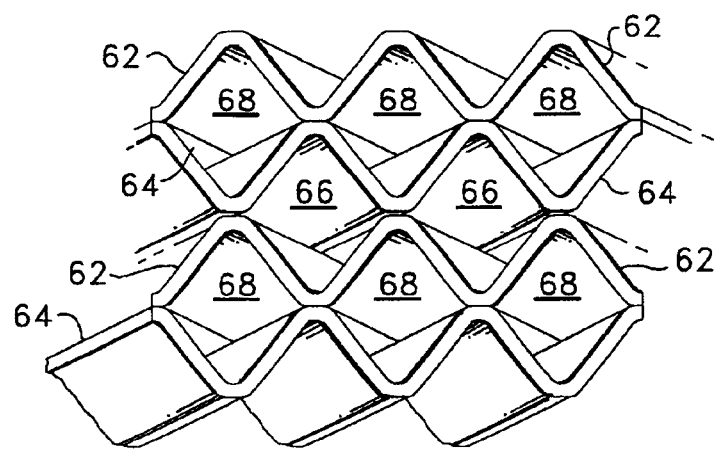
FIG. 6 is an isometric view of corrugated plates forming flow channels.

FIG. 6 shows a typical cross-section of a corrugated plate arrangement wherein the corrugations of plates 62 extend in an opposite direction to the corrugations of plates 64 thereby defining alternate reaction channels 66 and heated channels 68. FIG. 6 illustrates the preferred arrangement of corrugated plates where the herring bone pattern on the faces of opposing corrugated plates extends in opposite directions and the opposing plate faces contact each other to form the flow channels and to provide structural support to the plate sections.

Additional channels defined by the plates can provide a variety of supplementary functions. In addition to channels for the heating of reactants and cooling of the reaction zone that contains the exothermic reaction, other channel functions may include additional preheating of the feed for the exothermic reaction zone, cooling of the effluent from the exothermic reaction zone, and retaining a catalyst for an endothermic reaction.

Figure 8:
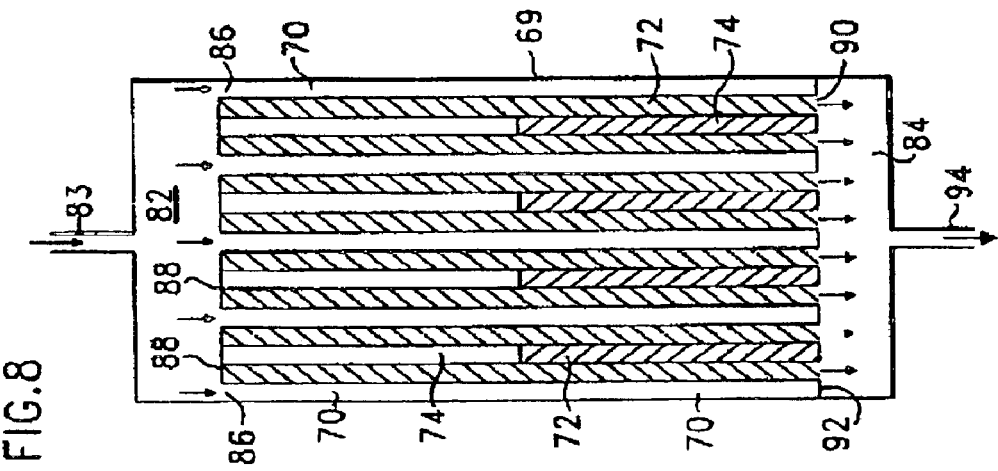
FIGS. 7 and 8 are schematic diagrams of alternate arrangements for the heating and reaction channels arranged in accordance with this invention.
Figure 7:
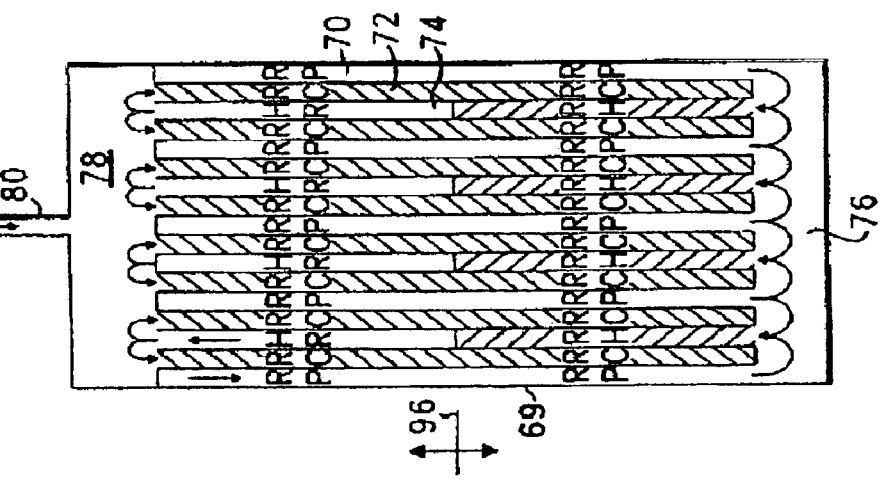

A reactor arrangement 69 having multi-function channels is shown in FIGS. 7 and 8. FIG. 7 shows one such channel arrangement with the functions of the different channels coded in the schematic representation. The coding terminology generally refers to the internal component or function of the channels and/or the effect of that function on the component within the subject channel. The letters "RP" designate a channel or channel section for preheating reactants. "HR" designates a channel or channel section that heats the reactants for the exothermic reaction. The letters "RC" indicate a channel or channel section that contains an exothermic reaction and reaction catalyst that receives indirect cooling. Letters "RH" show a channel or portion of a channel in which reactant heating takes place to continue an endothermic reaction which further cools the exothermic reaction zone or its reactants.

EXAMPLE

To more fully illustrate the process and apparatus of this invention, the following example shows the calculated operation of a process steam reforming of methane to produce methanol in a plate channel reactor arrangement of the type depicted by FIGS. 7 and 8. A methane-steam reforming process provides a mix of exothermic and endothermic reactions suitable for use in the arrangement as shown. Looking then at FIGS. 7 and 8 in the context of the steam reforming process, flow through the channels for the exothermic and endothermic process steps requires two different collection and distribution space arrangements. Fluid flow through the distribution/collection spaces can be controlled in a manner analogous to that described and depicted in FIGS. 1–4. In this example, 100 g moles of a methane feed and 250 g of steam enter the process. 60 g moles of the methane representing all of the methane feed for the endothermic reaction zone enters the plate reactor arrangement 69 through a nozzle 83. The amount of feed is targeted to provide a hydrogen to carbon ratio in the product of 2:1. A feed distribution chamber 82 provides a manifold that distributes the feed to inlet 86 of the preheat channels 70. Closure plates 88 block the tops of channels 72 and 74 where the channels are contiguous with the distribution chamber 82. Feed to the exothermic and endothermic reaction zones passes through the feed preheat channels 70 where indirect heat exchange with the exothermic reaction zone channels 72 raises the temperature of the feed. Preheated feed from channels 70 flows into a manifold space 76 shown in FIG. 7. Manifold space 76 serves as a collection and distribution space that forms a part of reactor 69. Manifold space 76 communicates the preheated feed with a lower section of channels 74 that contain catalyst for reactive cooling of the reactants from the preheat channels as a result of the endothermic reaction.

In this example of steam reforming, the lower section of channels 74 provides a space for the primary reforming reaction which produces synthesis gas from a fluid hydrocarbon such as natural gas. Operating conditions in the primary reforming stage can be in a temperature range of from 420° to 920° C. and, in this example, operate in a range of from 800° to 870° C. The specific operating pressures employed are principally influenced by the pressure requirements of the subsequent processing operations in which the reformed gas mixture is employed. Any superatmospheric pressure can normally be used in the practice of most reforming operations and is suitable for most applications of the apparatus and process of this invention. Pressures of from about 2 to 5 MPa are commonly employed although lower pressures can be used and pressures as high as 10 MPa can be maintained in particular applications. In this example, the primary reaction section operates at a pressure of about 3.8 MPa.

This endothermic reaction will contain a suitable catalyst composition such as solid catalyst granules deposited on an inert carrier material. The reactant stream normally contacts particulate catalyst in the endothermic and exothermic reaction channels of the steam reforming process. This steam reforming process can use one or more suitable reforming catalysts employed in conventional steam and secondary reforming operations. The metals of Group VIII of the Periodic System and/or oxides thereof and metals of the left hand elements of Group VI and/or oxides thereof are known reforming catalysts. Specific examples of reforming catalysts that can be used are nickel, nickel oxide, cobalt oxide, chromia, molybdenum oxide, and rhodium based catalyst on an α-alumina support. The catalyst can be employed with promoters and can receive various special treatments known in the art for enhancing its properties. Promoted nickel oxide catalysts are generally preferred, and the primary reformer channels are packed with solid catalyst granules, usually comprising metals such as nickel or other catalytic agents deposited on a suitable inert carrier material.

The catalyst may comprise discrete particles usually in a size range of from 2 to mm in diameter. The particles may have any shape, but they will typically comprise spheres or cylinders. The secondary reforming zone commonly contains a bed of similar catalyst material. As an alternate to a particulate catalyst, the catalyst may also be coated on the surface of the plates in the various reforming zones as previously mentioned.

In this example, the primary feed contacts particles of a nickel-type catalyst at a GHSV of 5000 to 8000 hr$^{-1}$. The primary reaction converts the heated feed to a gas mixture containing principally hydrogen and carbon monoxide according to reaction (1) as follows:

$$CH_4 + H_2O \leftrightarrows CO + 3H_2 \tag{1}$$

The preheated feed travels upwardly through the primary reforming channels 74 passing through the catalytic section "RH" and a non-catalytic section. The non-catalytic section "HR" provides further heating of the reactants while simultaneously cooling channels "RC" before entering a manifold space 78. Additional reactants or cooling fluids may enter the manifold space 78 through nozzle 80. In this case, an oxygen-containing gas and, optionally, additional feed or combustion fuel, enter manifold space 78 through nozzle 80. Manifold space 78 again serves as a collection and distribution space that forms a part of reactor 69. Partitions similar to those shown as 29 in FIGS. 1–4 separate manifold space 78 from the manifold space of chamber 82. Manifold space 78 mixes any fluid entering via nozzle 80 with the primary reforming zone effluent before distributing the heated feed to the secondary reforming channels 72. In this example, an additional 40 g moles of methane feed and 35 g moles of oxygen enter the secondary reforming channels.

The secondary reforming channels 72 contact the entering feed with nickel based catalyst at an average temperature of 1065° C. and pressure of 3.8 MPa along their entire length to promote the exothermic secondary reforming reaction. As the mixture passes downwardly through secondary reforming channels 72, it heats the channels 74 containing the primary reactants as well as the feed preheat channels 70. The necessary heat is supplied by the conventional secondary reforming reaction that oxidizes a fluid hydrocarbon fuel such as a side stream from the fluid hydrocarbon feed stream or a portion of the primary reforming effluent stream. Oxidation supplies the heat to the primary reformer by indirect heat exchange from channels RC. In the practice of the invention and in conventional practice, the secondary reforming operation is carried out to react unconverted methane present in the primary reformer effluent with air or other oxygen-containing gases. The following reactions occur in the secondary reforming zone:

$$2CO + \tfrac{1}{2}O_2 \rightarrow 2CO_2, \tag{2}$$

$$2CH_4 + O_2 \rightarrow 4H_2 + 2CO, \text{ and} \tag{3}$$

$$2H_2 + O_2 \rightarrow 2H_2O \tag{4}$$

Reactions (2), (3), and (4) are exothermic reactions that tend to occur quite rapidly in the secondary reaction space.

As the resulting gas mixture passes through the catalyst bed of the secondary reformer zone, the remaining methane is converted by reaction with steam in accordance with reaction (1) above and by the reaction with oxygen according to reaction (3) above so that very little methane remains in the product gas of the process. The strongly endothermic reaction (1) is a relatively slow reaction that occurs throughout the passage of the gases through the catalyst bed of the secondary reforming zone, thereby cooling the gases from the high temperatures reached by reactions (2), (3), and (4) that occur toward the feed end of the secondary reaction zone. In the practice of the invention, the proportions of oxygen and of the fluid hydrocarbon feed passed to the integrated primary-secondary reformers maintain an essentially, or completely, autothermal process with essentially no fuel requirement. An advantageous feature of the invention is the flexibility of being able to bypass a portion of the hydrocarbon feed stream directly to the secondary reforming reaction space at the feed end of the secondary reforming zone.

FIG. 8 shows an additional collection space 84 that forms a part of reactor 69 and again uses partitions to separate it from manifold space 76. The effluent from the exothermic reaction-containing channels enters collection space 84 and the open bottoms that provide outlets 90 of the secondary reforming channel 72. Outlets 90 contain an appropriate screen material to retain catalyst in the secondary reforming channels while permitting fluid to exit from the channels. The bottoms of primary reforming channels 74 are closed by closure plates 92 where they pass across collection space 84. A secondary reforming nozzle 94 withdraws the collected secondary reforming effluent. Further bypassing of feed between the primary and secondary reforming zone may be accomplished by external piping that communicates distribution space 82, collection space 84, and manifold spaces 76 with interconnecting flow paths. After passing through the two reaction steps, the process produces 54.3 g moles of a product having a H/HC ratio of 2.21.

The reaction arrangement has the versatility to offer additional preheating as well as isolation of the exothermic reaction zones. This is readily accomplished by varying the location of the catalyst loading between channels. Optionally, the space at one end of a channel may be used as a feed preheating zone or as an effluent cooling zone. FIGS. 7 and 8 schematically illustrate a partial loading of catalyst in the channels by a catalyst level line 96. Primary reforming channels 74 may contain catalyst from below line 96 to the inlets of the channels 74. In such an arrangement for steam reforming, as feed flows downwardly through feed preheat channel 70, the secondary reforming zone initially heats the feed indirectly with the reaction section of the secondary reforming channels 72. The primary reforming feed after heat exchange enters the primary reforming channel for reaction therein. Heat from the reaction in the secondary reforming channel 72 heats the primary reforming reaction zone in a lower portion of channel 74 as the feed passes upwardly therethrough. The effluent from the primary reaction zone continues to receive beat from the upper portion of channels 72 until it exits channels 74 and enters the tops of secondary reforming zone channels 72 for contact with the catalyst contained therein.

The arrangement of this invention can also be particularly suited for the dehydrogenation of ethylbenzene to produce styrene. The dehydrogenation of ethylbenzene to produce styrene is well known. Paraffinic feedstocks ordinarily have from about 3 to about 18 carbon atoms. Particular feedstocks will usually contain light or heavy paraffins. A catalytic dehydrogenation reaction is normally effected in the presence of catalyst particles comprised of one or more Group VIII noble metals (e.g., platinum, iridium, rhodium, palladium) combined with a porous carrier such as a refractory inorganic oxide. Alumina is a commonly used carrier. Dehydrogenation conditions include a temperature of from about 400° to about 900° C., a pressure of from about 0.01 to 10 atmospheres, and a liquid hourly space velocity (LHSV) of from about 0.1 to 100 hr$^{-1}$. Generally the lower the molecular weight of the feed, the higher the temperature required for comparable conversions. The pressure in the dehydrogenation zone is maintained as low as practicable, consistent with equipment limitations, to maximize the chemical equilibrium advantages. The preferred dehydrogenation conditions of the process of this invention include a temperature of from about 400° to 700° C. and a pressure from about 0.1 to 5 atmospheres.

In a preferred application of the apparatus, the arrangement in FIGS. 1–4 may be modified for the dehydrogenation of ethylbenzene to styrene. In order to suit the requirements for the preferred dehydrogenation of ethylbenzene, the flow arrangement outside of the reactor would require modification to provide a different flow of reactants and external heat exchange. The schematic internals of the reactor, shown by FIGS. 2–4, would remain essentially unchanged except for the possible elimination of the pipe distributor 30. Ignoring then the external heat exchange portion of FIG. 1 for a description of a styrene production process, a superheated steam stream would enter the reactor via line 16, distribution header 18, and distribution spaces 20. The distribution spaces 20 supply the superheated steam to inlets 42 of channels 44. Downward passage of the steam through channels 44 efficiently heats the reaction channels 22 by virtue of the large surface area provided by plates 25. Manifold space 45 collects the cooled steam from the open outlets 46 of the heated channels 44.

Ethylbenzene feed enters manifold space 45 from line 26. Manifold space 45 redistributes the steam and mixes it with the entering ethylbenzene feed to promote the dehydrogenation reaction of the steam and ethylbenzene mixture as it passes through the inlets 23 of reaction channels 22. Some form of pipe distributor may be useful in manifold 45 to distribute the ethylbenzene feed. However, direct injection of the ethylbenzene feed into inlets 23 is not essential to the use of the apparatus for ethylbenzene dehydrogenation. The reaction channels 22 contain an ethylbenzene dehydrogenation catalyst. Catalyst material may again reside in the channels as a coating applied to the plates 25 or as discrete particles retained in the channels by an appropriate screen material across inlets 23. Indirect heating across plates 25 compensates for the cooling effect of the endothermic dehydrogenation reaction as the ethylbenzene and steam mixture passes up reaction channels 22.

A collection space 24 collects the dehydrogenation zone product stream from the outlets 27 of channels 22. The manifold 48 gathers the collected reactor effluent mixture of styrene, ethylbenzene, and steam and transfers it into the product line 14 for recovery of product components and recycle of reactants and steam. The effluent stream from the dehydrogenation zone generally will contain unconverted dehydrogenatable hydrocarbons, hydrogen, and the products of dehydrogenation reactions. This effluent stream is typically cooled and passed to a hydrogen separation zone that separates a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds. Additional information related to the operation of dehydrogenation catalysts, operating conditions, and process arrangements can be found in U.S. Pat. No. 4,677,237, U.S. Pat. No. 4,880,764, U.S. Pat. No. 5,043,500 and U.S. Pat. No. 5,087,792, the contents of which are hereby incorporated by reference.

A variety of other combinations of channel functions can be combined in single pass or multiple pass arrangement. The use of a plate heat exchange reactor facilitates arrangement of heat exchange channels in a wide degree of desired functionality in either single or multiple stack arrangements.

For example, the upper and lower sections of channels 74, shown as theoretically separated across catalyst loading line 96, may be readily separated physically into two separate reaction zones. Collection and distribution manifolds similar to those shown in FIGS. 1–4, 7 and 8 can internally communicate fluid streams between the sections of separated channels. More usefully, the manifold arrangements may be used to externally communicate reaction channels contained in a single reaction vessel. External communication will facilitate control of gas streams to the different reaction zones and heat exchange zones. External control will also permit a wide variety of flow paths to be provided between the different channel arrangements.

Figure 9:
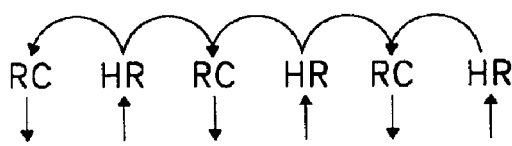
FIGS. 9 and 10 are charts showing the placement of heat exchange and reaction zones in channels.
Figure 9:
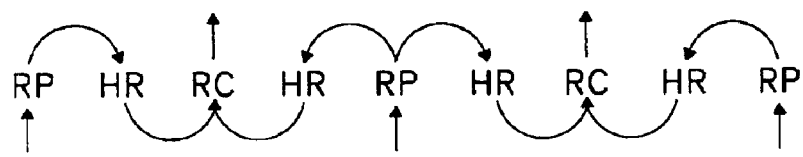
Figure 9:
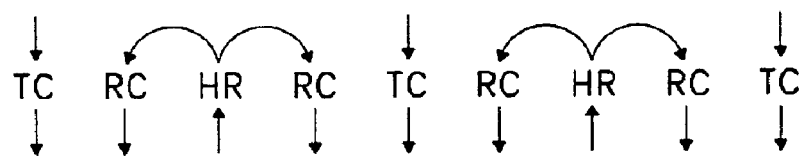
Figure 9:
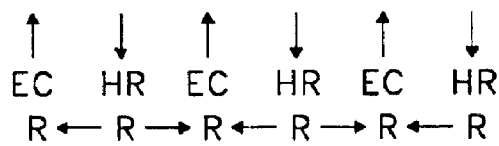
Figure 10:
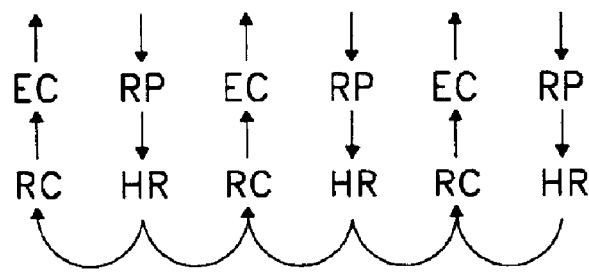
Figure 10:
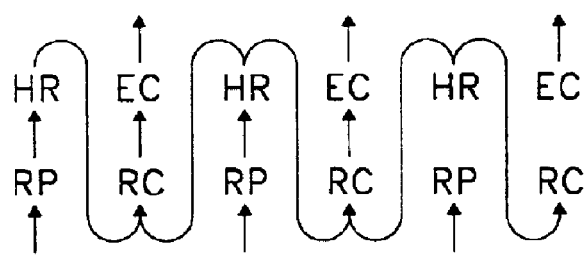
Figure 10:
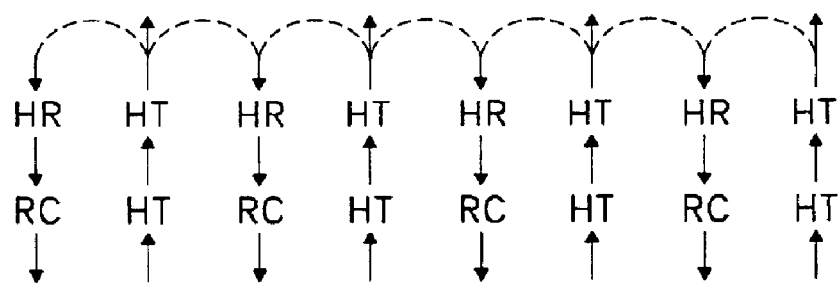

In the way of further illustration, FIGS. 9 and 10 are charts showing a coding for possible arrangements of channel functions across a plurality of channels defined by plate elements. In addition to the codes RC, HR, RP, and RH of FIGS. 7 and 8, charts 10 and 11 of FIGS. 9 and 10 include other codes. "TC" indicates a channel that contains an additional process fluid for providing temperature control to the channels containing the reactants or the reaction effluent. "HT" designates a channel that withdraws heat from one channel section and supplies heat to another channel section. "EC" stands for a channel where the effluent from the exothermic reaction zone undergoes cooling. "R" designates a reaction zone where there is no substantial heat exchange in the reaction zone.

FIG. 9 depicts three cases of configurations for interconnecting parallel channels in a repeating pattern of functions. Case 1 of FIG. 10 represents the arrangement of channels similar to FIGS. 1–4 where the heating of reactants for the exothermic reaction takes place in alternate HR and RC channels that are located next to each other. Case 2 represents an arrangement that adds an additional preheat channel in between each reactant heating channel and in a counter-flow arrangement therewith to provide additional heat exchange of the reactants before entering the exothermic reaction channels. Case 3 adds a channel TC between the reaction channels to allow temperature adjustment for the exothermic reaction zone. In most cases, the TC channels will independently circulate a fluid steam for removing additional heat from the exothermic reaction channels. Case 4 illustrates the use of a separate reaction space for the exothermic reaction with indirect heat exchange between the hot effluent and the entering feed to supply and recover heat associated with the reaction zone. In such an arrangement, the catalyst for the exothermic reaction may be located in the manifold section that communicates the channels.

FIG. 10 represents further arrangements wherein multiple stacks of channels are interconnected externally or internally in a manner that provides different channel functions. All of the configurations in the chart of FIG. 10 are simplified representations of arrangements where the reactants pass through separate upper and lower sections of heat exchange channels. A suitable manifold section can interconnect the upper and lower manifold sections to provide the necessary communication of fluids. The manifold sections may also provide convenient locations for the addition or withdrawal of supplementary fluids.

Case 5 of FIG. 10 shows a two-pass exchanger section. The relatively cold reactants enter the process through the upper channels RP for preheating the reactant. After preheating, the reactants then pass into the lower portion of the channels for further heating of the reactants. As indicated by the arrows, a manifold space directs the heated feed into the lower exothermic reaction channels which releases heat into the channels for heating the reactants in channels HR. The exothermic reaction zone effluent passes upwardly into the effluent cooling channels EC that provide heat for the reactant preheat section.

Case 6 of FIG. 10 representatively illustrates another two-channel group arrangement that differs from Case 5 by indirectly exchanging heat across common plates of the preheat channels and the reactant channels RC while cooling the effluent from the exothermic reaction zone against the common plates of the heated channels HR. The concurrent flow offered by this arrangement places the coldest entering reactants directly opposite the reaction zone and the hottest exiting effluent against the reacted channels. External piping can connect the HR channels with the RC channels.

Case 7 of FIG. 10 shows a variation where an internal or external heat transfer fluid carries the heat from the heated channels to the reaction channels via the heat transfer channels HT. In this arrangement, the fluid in the HT channels may be an independently circulated fluid or it may be one of the reactants that is circulated in a manifold arrangement via the dotted lines that schematically represent a manifold.

Further enhancement of temperature control may be obtained by using intermediate injection of the oxidation fluid or additional fuel. Operating with a counter-current or co-current flow of the primary reactants leaves the sides of the channels available for cross-flow injection of intermediate oxidation fluid or feed. A cross-flow pattern provides an additional control on the generation of heat at specific locations, thereby allowing adjustment of the temperature profile in the secondary reforming zone. Where the secondary reforming zone exchanges heat directly against the primary reforming zone, intermediate injection can also be used to influence the temperature profile within the primary reforming zone.

What is claimed is:

1. An apparatus for contacting reactants with a catalyst in a reaction zone while indirectly cooling the reaction zone by indirectly heating a reactant stream, the apparatus comprising:

a plurality of reaction channels defined by a plurality of plates having heated reactant inlets at one end of the reaction channels and reacted stream outlets at an opposite end of the reaction channels;

a solid catalyst in the reaction channels;

a plurality of heated channels defined by a plurality of plates in an indirect heat exchange relationship with the reaction channels, the heated channels having cold reactant fluid inlets at one end of the heated channels and heated reactant outlets at an opposite end of the heated channels;

a solid catalyst for the promotion of one of an exothermic process and an endothermic process in the heated channels and the solid catalyst in the reaction channels is for the promotion of the other of an exothermic process and an endothermic process;

a containment vessel for housing the plurality of plates;

a chamber defined by the containment vessel for communicating the heated reactant outlets with the heated reactant inlets; and a support structure for supporting one end of the plates from the top or the bottom of the containment vessel.

2. The apparatus of claim 1 wherein the channels have an average width of less than 1 inch.

3. The apparatus of claim 1 wherein the plates are flat.

4. The apparatus of claim 1 wherein the reaction channels and the heated channels are defined by the same plurality of plates and the heat exchange relationship provides direct heat transfer between the reaction channels and the heated channels through the plates.

5. The apparatus of claim 1 wherein a port communicates with the chamber for adding or withdrawing fluid from the chamber.

6. The apparatus of claim 1 wherein the plates define corrugations and the corrugations maintain spacing between the plates.

7. An apparatus for contacting reactants with a catalyst in a reaction zone while indirectly cooling the reaction zone by indirectly heating a reactant stream, the apparatus comprising:

a plurality of reaction channels defined by a plurality of plates having heated reactant inlets at one end of the reaction channels and reacted stream outlets at an opposite end of the reaction channels;

means for retaining a solid catalyst in the reaction channels;

a distributor with nozzles for injecting fluid at or near said reactant inlets;

a plurality of heated channels defined by a plurality of plates in an indirect heat exchange relationship with the reaction channels, the heated channels having cold reactant fluid inlets at one end of the heated channels and heated reactant outlets at an opposite end of the heated channels;

a containment vessel for housing the plurality of plates;

a chamber defined by the containment vessel for communicating the heated reactant outlets with the heated reactant inlets; and a support structure for supporting one end of the plates from the top or the bottom of the containment vessel.

8. The apparatus of claim 7 wherein the channels have an average width of less than 1 inch.

9. The apparatus of claim 7 wherein the plates are flat.

10. The apparatus of claim 7 wherein the reaction channels and the heated channels are defined by the same plurality of plates and the heat exchange relationship provides direct heat transfer between the reaction channels and the heated channels through the plates.

11. The apparatus of claim 7 wherein a port communicates with the chamber for adding or withdrawing fluid from the chamber.

12. The apparatus of claim 7 wherein the plates define corrugations and the corrugation maintain spacing between the plates.

* * * * *